United States Patent
Thomas et al.

(10) Patent No.: US 9,784,370 B2
(45) Date of Patent: Oct. 10, 2017

(54) SEAL WITH ONE OR MORE ENGAGING FEATURES

(71) Applicants: Michael Thomas, Sycamore, IL (US); Todd Buehrer, Hampshire, IL (US)

(72) Inventors: Michael Thomas, Sycamore, IL (US); Todd Buehrer, Hampshire, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/867,145

(22) Filed: Sep. 28, 2015

(65) Prior Publication Data

US 2017/0089466 A1    Mar. 30, 2017

(51) Int. Cl.
| | |
|---|---|
| *F16J 15/32* | (2016.01) |
| *F16J 15/3264* | (2016.01) |
| *F16J 15/3208* | (2016.01) |
| *F16J 15/3268* | (2016.01) |
| *F16C 33/72* | (2006.01) |
| *F16J 15/3252* | (2016.01) |
| *F16J 15/3276* | (2016.01) |

(52) U.S. Cl.
CPC .......... *F16J 15/3264* (2013.01); *F16C 33/72* (2013.01); *F16J 15/3208* (2013.01); *F16J 15/3252* (2013.01); *F16J 15/3268* (2013.01); *F16J 15/3276* (2013.01)

(58) Field of Classification Search
CPC .... F16J 15/32; F16J 15/32104; F16J 15/3208; F16J 15/3212; F16J 15/3216; F16J 15/322; F16J 15/3244; F16J 15/3248; F16J 15/3252; F16J 15/3268; F16J 15/3276
See application file for complete search history.

(56) References Cited

U.S. PATENT DOCUMENTS

| | | | | |
|---|---|---|---|---|
| 4,304,414 A | * | 12/1981 | Forch | F16J 15/322 277/565 |
| 4,623,153 A | * | 11/1986 | Nagasawa | F16J 15/322 277/551 |
| 4,664,392 A | * | 5/1987 | Hatch | F16J 15/3228 277/551 |
| 4,721,314 A | | 1/1988 | Kanayama | |
| 4,822,059 A | * | 4/1989 | Shimasaki | F16J 15/3276 277/564 |
| 4,943,068 A | | 7/1990 | Hatch | |
| 5,052,696 A | * | 10/1991 | Hatch | F16J 15/3232 277/562 |
| 5,855,375 A | | 1/1999 | Wilcox et al. | |

(Continued)

OTHER PUBLICATIONS

Non-Final Office Action dated Jun. 17, 2016, U.S. Appl. No. 14/824,415, filed Aug. 12, 2015, pp. 1-9.

*Primary Examiner* — Gilbert Lee
(74) *Attorney, Agent, or Firm* — Mark Ussai; SKF USA Inc. Patent Dept.

(57) ABSTRACT

A seal and a seal assembly. The seal includes a generally annular casing, an engaging feature coupled to or integral with the casing and configured to be coupled to an accessory that is separate from the casing, and a generally annular sealing element coupled to the casing, the engaging feature, or both. The sealing element is configured to seal with a relatively movable member, wherein the engaging feature is separately-formed from the sealing element.

21 Claims, 3 Drawing Sheets

(56) References Cited

U.S. PATENT DOCUMENTS

| | | | | |
|---|---|---|---|---|
| 6,123,514 A | * | 9/2000 | Kawaguchi | F04B 27/1036 |
| | | | | 277/559 |
| 6,209,879 B1 | * | 4/2001 | Mizunoya | F16J 15/3232 |
| | | | | 277/352 |
| 6,367,810 B1 | * | 4/2002 | Hatch | F16J 15/3228 |
| | | | | 277/551 |
| 6,517,083 B2 | * | 2/2003 | Yamada | F16J 15/3244 |
| | | | | 277/559 |
| 6,840,521 B2 | * | 1/2005 | Ikeda | F16J 15/322 |
| | | | | 277/549 |
| 7,753,377 B2 | * | 7/2010 | Laplante | F16J 15/3224 |
| | | | | 277/569 |
| 7,832,735 B2 | | 11/2010 | Paykin | |
| 8,256,772 B2 | * | 9/2012 | Itadani | F16J 15/322 |
| | | | | 277/353 |
| 8,579,297 B2 | | 11/2013 | Arita | |
| 2002/0185822 A1 | * | 12/2002 | Spain | F16J 15/3216 |
| | | | | 277/569 |
| 2009/0134585 A1 | | 5/2009 | Shimomura | |
| 2010/0244389 A1 | | 9/2010 | Sanada | |
| 2014/0062031 A1 | | 3/2014 | Honzek | |
| 2014/0151967 A1 | | 6/2014 | Benedix | |

\* cited by examiner

SEAL WITH ONE OR MORE ENGAGING FEATURES

BACKGROUND

Radial seals are used in a variety of industrial contexts. For example, seals may be used to protect a bearing from contaminants and maintain grease or oil therein. The seals generally include a flexible element that engages (or nearly engages) a rotating element, often a shaft, and a more rigid element that connects with a housing or another generally stationary body. The seal thus allows the shaft to rotate (or otherwise move) relative to the housing, while maintaining a seal.

Many different sizes of seals are employed in different machines. Further, in some applications, secondary seals and/or other structures may be employed to supplement the functionality of the seals. Thus, seals are often custom-designed for the particular machine in which they are used. Accordingly, relatively small customer orders for such seals may present a challenge, because it may not be practical to maintain a large inventory of every conceivable size and configuration of seal. Thus, such small orders may result in essentially a custom manufacturing run of the ordered seal. Typically, manufacturers react by attempting to simplify the manufacturing process, reducing the part count wherever possible. While this may be effective in some contexts, the challenge of inventory limitations may persist, and such small runs may make the seal manufacturing process less economical.

SUMMARY

Embodiments of the disclosure may provide a seal that includes a generally annular casing, an engaging feature coupled to or integral with the casing and configured to be coupled to an accessory that is separate from the casing, and a generally annular sealing element coupled to the casing, the engaging feature, or both. The sealing element is configured to seal with a relatively movable member, wherein the engaging feature is separately-formed from the sealing element.

Embodiments of the disclosure may also provide a sealing assembly that includes a seal. The seal includes a generally annular casing, an engaging feature coupled to or integral with the casing, and a generally annular sealing element coupled to the casing, the engaging feature, or both. The sealing element is configured to seal with a relatively movable member, and the engaging feature is separately formed from the sealing element. The sealing assembly also includes an accessory configured to engage the engaging feature.

BRIEF DESCRIPTION OF THE DRAWINGS

The accompanying drawings, which are incorporated in and constitutes a part of this specification, illustrates an embodiment of the present teachings and together with the description, serves to explain the principles of the present teachings. In the figures.

Figure 1:
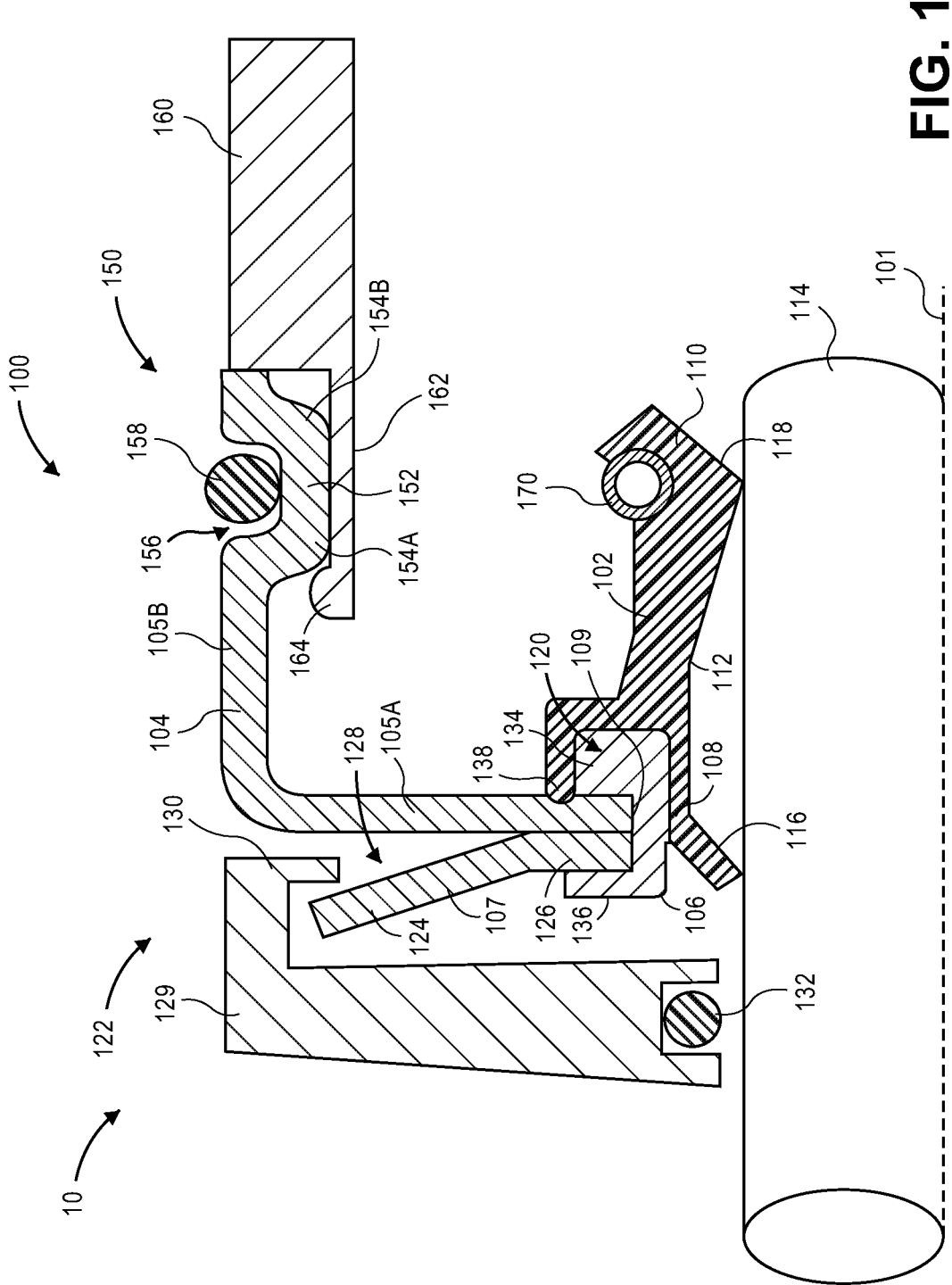
FIGS. 1, 2, 3, 4, and 5 each illustrate a partial, side cross-sectional view of a seal, according several embodiments.

It should be noted that some details of the figures have been simplified and are drawn to facilitate understanding of the embodiments rather than to maintain strict structural accuracy, detail, and scale.

DETAILED DESCRIPTION

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B." As the term is used herein, "about equal" generally refers to two things (e.g., measurements) which are equal to each other taking into consideration a reasonable tolerance dependent upon the application, circumstances, etc.

In general, embodiments of the present disclosure may provide a seal with a modular casing and sealing element, which may allow for the custom sizing thereof, such that the assembled seal may be operable in a variety of applications. Further, the seal may include one or more engaging features. The engaging feature may provide a connection point for a secondary device or "accessory" that may add or enhance functionality of the seal. Further, the engaging feature may, in some embodiments, be employed to connect the sealing element to the casing. The engaging feature may be provided in a variety of forms, and the term "engaging feature" encompasses any structural feature capable of engaging an accessory that is separate from the sealing element and the casing.

Turning now to the illustrated example embodiments, FIG. 1 depicts a partial, cross-sectional view of a sealing assembly 10, according to an embodiment. The sealing assembly 10 may include a seal 100, which may be generally annular, and thus it will be appreciated that the illustrated cross-section may extend around a central, longitudinal axis 101 (horizontal in this view). However, in some embodiments, the cross-section of the seal 100 may not remain constant but may have differences along the circumferential direction. The seal 100 may also form a generally annular shape. As the term is used herein, "generally annular shape" refers to a shape that has an inner diameter and an outer diameter, and which may extend around a central axis. Further, generally annular shapes may be continuous or may be segmented or otherwise contain discontinuities such as slots, protrusions, etc.

The sealing element 102 may extend between first and second axial ends 108, 110, may define an inner diameter surface 112, and may extend circumferentially around the central axis 101. The inner diameter surface 112 may extend axially (i.e., parallel to the central axis 101) along a relatively movable member, e.g., a rotatable shaft 114, and may be configured to seal or otherwise engage therewith. To accomplish such sealing with the shaft 114, the sealing element 102 may include one or more lips 116 and/or one or more inner profiles 118. The sealing element 102 may be made of a relatively soft, elastic material, such as rubber or another elastomer. In other embodiments, the sealing element 102 may be made at least partially from a fiber-reinforced material (e.g., a "composite material"), a plastic, or any other suitable material.

The casing 104 may extend radially outward from an inner diameter surface 109 that is proximal to the sealing element 102, along a first, radial portion 105A, and axially, parallel to the sealing element 102 along a second, axial portion 105B. In an embodiment, at least a portion of the sealing element 102 may be received radially within the axial portion 105B of the casing 104.

In addition to the sealing element 102 and the casing 104, the seal 100 may include at least one engaging feature. In the illustrated embodiment of FIG. 1, the seal 100 includes two engaging features. The first engaging feature may be at least partially provided by a generally-annular connecting insert 106. The connecting insert 106 may be received into a pocket 120 formed in the sealing element 102. For example, the sealing element 102 may be molded around the connecting insert 106 and/or bonded thereto, on one, two, three, or more sides of the insert 106. Accordingly, the insert 106 may be made from a material with a higher melting point than the sealing element 102, and/or may be made from a material with a higher rigidity. Thus, the insert 106 may serve an additional function of providing a shape to what may otherwise be a relatively deformable sealing element 102. In an example, the insert 106 may be formed from metal (e.g., an alloy of two or more metals), a plastic, a composite material, or the like. In other embodiments, the sealing element 102 may be connected to the connecting insert 106 in other ways.

The seal assembly 10 may further include a first accessory 122, which may include a sealing element 132 that is configured to seal with the shaft 114. The sealing element 132 may be, for example, an O-ring, and may be configured to seal with the shaft 114. In other embodiments, the first accessory 122 may include a secondary exclusionary device (e.g., a shield, deflector, dust cover, spacer, etc., in addition to or instead of the sealing element 132. The first accessory 122 may also include a connector 107. The connector 107 may include a frustoconical portion 124 and a radial portion 126. The frustoconical portion 124 may be radially outward of the radial portion 126.

The insert 106 may engage the radial portion 105A of the casing 104 as well as the radial portion 126 of the connector 107. As such, the insert 106 may perform the functions of connecting the sealing element 102 to the casing 104, and connecting the seal 100 with the first accessory 122.

In the example illustrated in FIG. 1, the inner diameter surface 109 of the radial portion 105A of the casing 104 and the radial portion 126 of the connector 107 are received axially between a base 134 of the insert 106 and a crimping extension 136 thereof that extends from the base 134. The crimping extension 136 may initially extend axially, and may be bent to the illustrated radial orientation, so as to form an interference fit (crimp) between the insert 106, the casing 104, and the connector 107. For example, as shown, at least part of the radial portion 105A of the casing 104 and at least part of the radial portion 126 of the connector 107 may be sandwiched between the crimping extension 136 and the base 134. For example, the radial portion 126 of the connector 107 may be between the crimping extension 136 and the radial portion 105A of the casing 104. The interference generated may prevent the inner diameter surface 109 of the casing 104 and the radial portion 126 of the connector 107 from moving relative to the insert 106. Moreover, the connector 107 and the casing 104 may be connected together, e.g., via welding, soldering, brazing, bonding, etc.

The first accessory 122 may also include a secondary sealing structure 129, which may be coupled with the sealing element 132. The secondary sealing structure 129 may include a hook 130, which may be configured to engage with the connector 107, and thereby secure the secondary sealing structure 129 to the seal 100. For example, the frustoconical portion 124 of the connector 107 may extend at an angle to the radial portion 105A of the casing 104, thus defining a gap 128 therebetween, with the gap 128 expanding as proceeding radially outwards. The hook 130 may be received into the gap 128, e.g., over an outer circumference of the frustoconical portion 124, thereby securing the position of the secondary sealing structure 129 with the seal 100.

The sealing element 102 may also include a sealing rib 138, which may provide a sealing interface between the sealing element 102 and the casing 104, e.g., the radial portion 105A thereof. Accordingly, the interface between the casing 104 and the insert 106 may, in some embodiments, not be fluid-tight, but in other embodiments, it may be. In an embodiment, the sealing rib 138 may extend axially. The sealing rib 138 may be rounded, as shown, but in other embodiments, may be any other suitable shape. Furthermore, the sealing rib 138 may be integral with the remainder of the sealing element 102, as shown, but in other embodiments, may be provided by a separate member (e.g., an O-ring) coupled with the sealing element 102 and disposed between the sealing element 102 and the casing 104.

The second engaging feature of the seal 100 may be located, for example, on an opposite axial end of the seal 100 from the connector 107, as generally indicated by reference number 150. In an embodiment, the second engaging feature 150 may be formed from a ridge 152 in the casing 104. For example, as shown, the ridge 152 may protrude radially inward, e.g., formed between two bends 154A, 154B in the casing 104. The bends 154A,B may be spaced apart to form the ridge 152 in the casing 104 therebetween. Further, the outside of the ridge 152 may define a recess 156. In an embodiment, an outer seal 158 may be received into the recess 156, and may seal the casing 104 with a stationary outer housing.

The assembly 10 may include a second accessory 160, which may be, for example, a spacer or secondary sealing element or other auxiliary device. In an embodiment, the second accessory 160 may form a snap-fit with the ridge 152. Such snap-fit may be accomplished by providing the second accessory 160 with a deformable section 162 which be configured to resiliently deflect, e.g., under a reduced force with respect to a remainder of the second accessory 160. In some embodiments, the deformable section 162 may be formed from a flexible material, whether the same as or different from the material from which a remainder of the second accessory 160 is formed and/or may have a reduced thickness. Further, in some embodiments, the deformable section 162 may be formed from a plurality of circumferentially spaced apart fingers, but in other embodiments, the deformable section 162 may be continuous around the central axis 101.

A protrusion 164 may be formed at an end of the deformable section 162 and may extend outward therefrom. Accordingly, to assemble the second accessory 160 onto the seal 100, the deformable section 162 may be deflected inwards, allowing the protrusion 164 to move radially within and axially past the ridge 152, until reaching an opposite axial side of the ridge 152. The deformable section 162 may then resiliently expand outwards, such that the protrusion 164 and the deformable section 162 engages the ridge 152 and resists dislocation of the second accessory 160 and the casing 104. In some embodiments, the casing 104 may rotate relative to the second accessory 160 (and/or vice versa, depending on the reference plane), while in other embodiments, the second accessory 160 and the casing 104 may be constrained from rotating relative to one another by the engagement between the second accessory 160 and the second engaging feature 150.

Further, the seal 100 may include a spring ring 170, e.g., near to or at the second axial end 110. The spring ring 170 may be configured to expand elastically during installation and thus apply a generally uniform, radially-inward force on the sealing element 102, causing the sealing element 102 to engage the shaft 114.

Although the present embodiment of the seal 100 has been described with the sealing element 102 radially-inward of the casing 104, it will be appreciated that this arrangement may be reversed, e.g., in situations where the shaft 114 is stationary and the outer housing is relatively movable. Further, various other components may be provided along with or in lieu of at least some of those described depending on the application without departing from the scope of the present disclosure.

Figure 2:
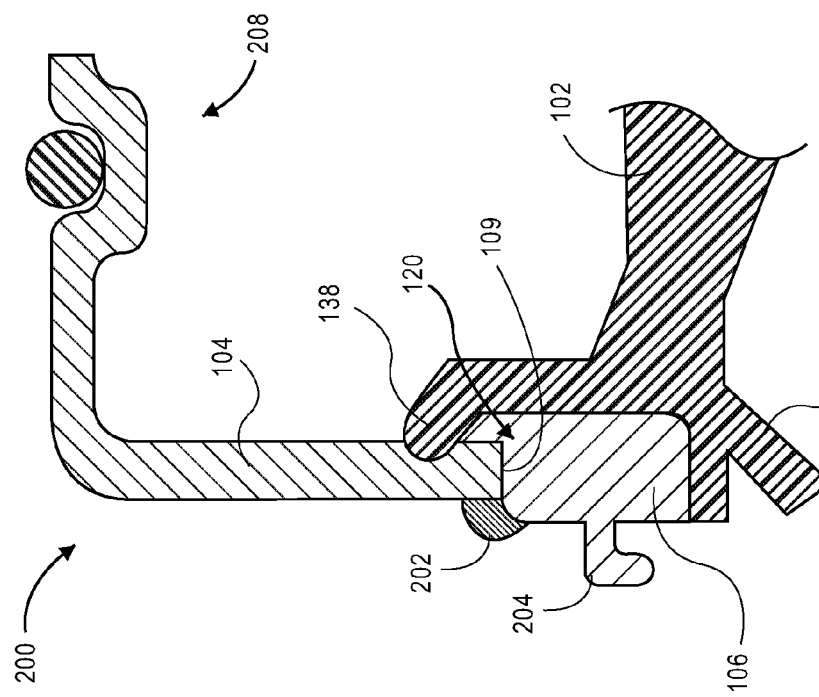

FIG. 2 illustrates a partial, cross-sectional view of another seal 200, according to an embodiment. The seal 200 may include components that are similar to those of the seal 100 (FIG. 1), and such similar components are given like numbers and a duplicate description is omitted.

As with the seal 100, the sealing element 102 of the seal 200 may include the first engaging feature, e.g., as provided by the insert 106 that is received and retained in the pocket 120 of the sealing element 102. Further, the insert 106 may be welded, soldered, or bonded to the casing 104. For example, a weld 202 may be formed at the intersection of the casing 104 and the insert 106, e.g., proximal to the inner diameter surface 109 of the casing 104. In some embodiments, the casing 104 may be welded, soldered, or bonded to the insert 106 in addition to being crimped thereto via a crimping extension 136 (FIG. 1), and thus such connection processes should not be considered mutually exclusive.

The insert 106 may also include a hook 204. The hook 204 may be coupled to (e.g., integral with) the insert 106, as shown, but in other embodiments, may be coupled with the casing 104. Further, the hook 204 may extend radially inwards, radially outwards, or a combination thereof. In other embodiments, the hook 204 may have any other suitable geometry. The hook 204 may extend continuously circumferentially along the seal 200, but, in other embodiments, may be segmented so as to form a plurality of hooks spaced circumferentially apart as proceeding around the central axis 101 (FIG. 1). Accordingly, an accessory (such as the first accessory 122 of FIG. 1) may be configured to be secured to the hook 204 and be constrained at least in axial position with respect thereto. In some embodiments, the accessory may be rotatable with respect to the insert 106, but in other embodiments, may be constrained from rotation by engagement with the hook 204. The seal 200 may also include a second engaging feature 208, which may be substantially similar to the second engaging feature 150 of the seal 100.

Figure 3:
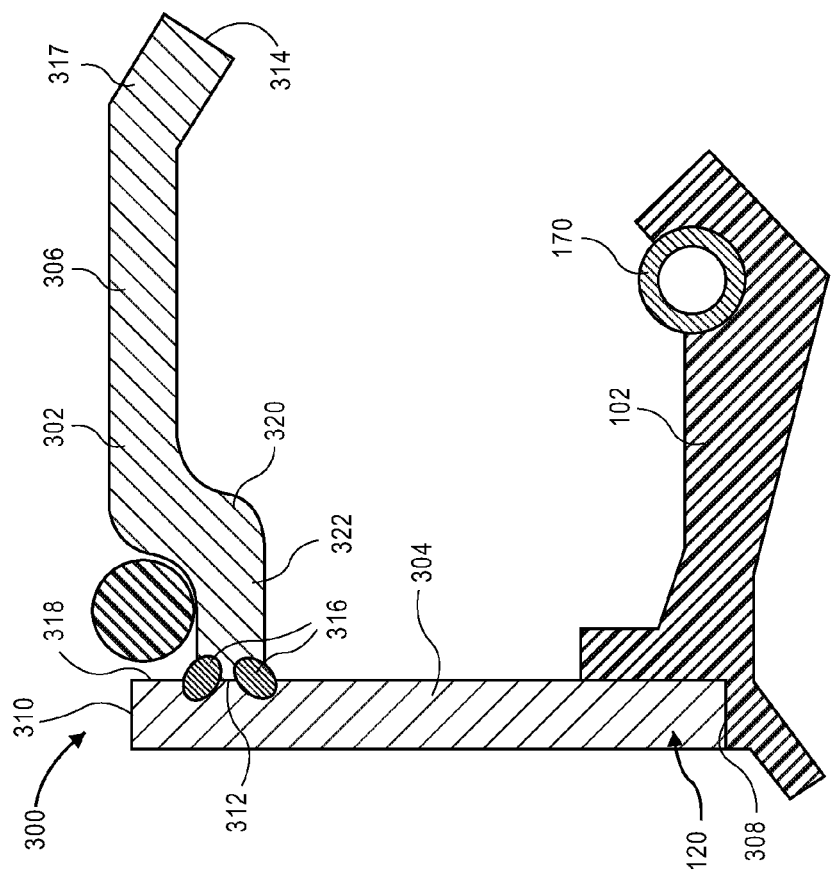

FIG. 3 illustrates a partial, cross-sectional view of a seal 300, according to an embodiment. The seal 300 may include components that are similar to those of the seal 100 (FIG. 1), and such similar components are given like numbers and a duplicate description thereof is omitted.

The seal 300 may include a two-part casing 302. A first part 304 of the casing 302 may extend generally radially, e.g., having a disk-shape. A second part 306 of the casing 302 may extend generally axially, e.g., having a tubular shape. Accordingly, the first part 304 may have an inner diameter surface 308 and an outer diameter surface 310, and the second part 306 may have two opposing axial ends 312, 314. The axial end 312 may be connected with the first part 304 of the casing 302, e.g., at one or more connection locations 316 proximal to the outer diameter surface 310. The connection locations 316 may be on a radially outer corner between the first and second parts 304, on a radially inner corner therebetween, or, as shown, both.

In some embodiments, the first part 304 of the casing 302 may be considered the insert (e.g., similar to the insert 106 discussed above), and, as such, the second part 306 may be considered to be the casing 302 itself. However, for purposes of description herein, the casing 302 is discussed herein as having the first and second parts 304, 306.

The sealing element 102 may include the pocket 120, which, in this embodiment, may receive the first part 304 of the casing 302. The sealing element 102 may thus be connected directly to the first part 304 of the casing 302. For example, the sealing element 102 may be molded around and/or bonded to the first part 304 of the casing 302.

The seal 300 may include two engaging features. The first engaging feature may be provided proximal to the outer diameter surface 310. For example, the axial end 312 of the second part 306 of the casing 302 may be offset radially inward from the outer diameter surface 310 of the first part 304, thereby forming a lip 318 along an outer portion of the first part 304, radially between the axial end 312 and the outer diameter surface 310. The lip 318 may function similarly to the hook 204 (FIG. 2), providing a connecting point for an accessory (or a portion thereof). More specifically, in the illustrated embodiment, the second part 306 may include an inward bend 320 proximal to the axial end 312.

Thus, a ridge 322 may be formed extending between the bend 320 and the axial end 312. The ridge 322 may provide a radially-inward offset for the end 312 from the outer diameter surface 310 of the first part 304. A remainder of the second part 306 may define an outer diameter that may be radially outward from the outer diameter defined by the outer diameter surface 310 of the first part 304, such that the second part 306 may engage with a bore of a housing in which the seal 300 is positioned.

The second engaging feature of the seal 300 may be provided by the second part 306 of the casing 302, proximal to the axial end 314 (e.g., opposite of the axial end 312). In particular, the second part 306 may include a bent portion 317, which may extend axially to the axial end 314. The bent portion 317 may extend at an angle, radially inwards, thereby providing a hook onto which a second accessory may be attached (e.g., similar to the ridge 152 in FIG. 1).

Figure 4:
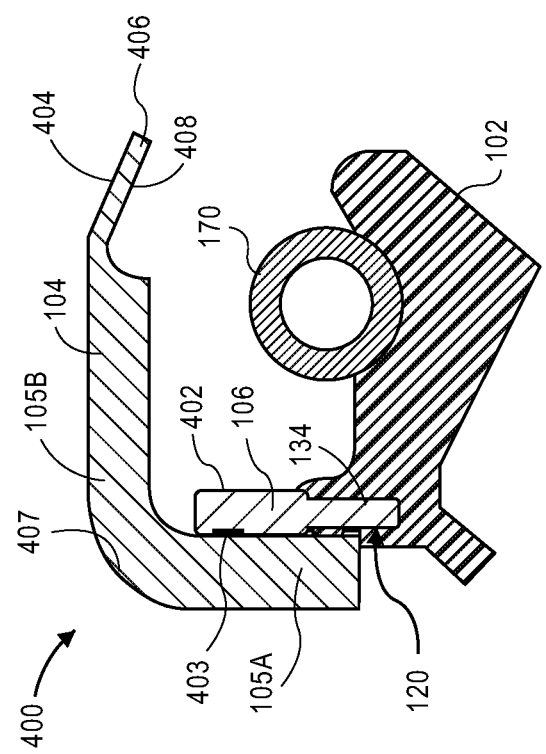

FIG. 4 illustrates a partial, cross-sectional view of a seal 400, according to an embodiment. The seal 400 may include components that are similar to those of the seal 100 (FIG. 1), and such similar components are given like numbers and a duplicate description thereof is omitted.

The seal 400 may include the insert 106 having the base 134 thereof disposed in the pocket 120. In this embodiment, the insert 106 may not provide an engaging feature. As shown, a radial extension 402 of the insert 106 may extend radially outwards from the base 134 and out of the pocket 120. The radial extension 402 may be attached to the casing 104, e.g., the radial portion 105A thereof. The radial extension 402 may be welded to the casing 104, in an embodiment, thereby forming a weld 403. In other embodiments, the radial extension 402 may be soldered, bonded, fastened, or otherwise attached to the casing 104. In still other embodiments of the seal 400, the insert 106 may take any of the forms of the insert 106 of any other the other seals described herein.

The seal 400 may include an engaging feature 404. The engaging feature 404 may be formed proximal to, e.g., extending axially from, an axial end 406 of the casing 104 and may be integral with the casing 104; however, in some embodiments, the engaging feature 404 may be separate and connected to the casing 104. The axial portion 105B of the casing 104 may extend axially from the axial end 406 until meeting the radial portion 105A thereof at a bend 407 (e.g., if the two portions 105A,B are integral, or a connection between the two portions 105A,B if they are not).

The engaging feature 404 may include another bent (e.g., radially-inward) portion 408 of the casing 104, which may have a reduced radial thickness as compared to a remainder of the casing 104. An accessory may be coupled with the engaging feature 404 to resist displacement of the casing 104 and the accessory in at least one axial direction, e.g., using a complementarily-shaped hook or another structure that is configured to cooperate with the engaging feature 404.

Figure 5:
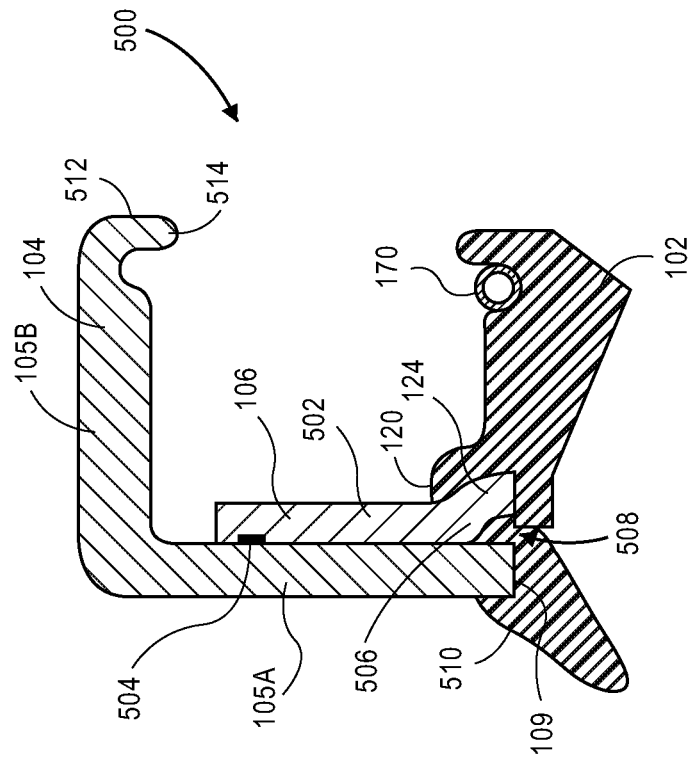

FIG. 5 illustrates a partial, cross-sectional view of a seal 500, according to an embodiment. The seal 500 may include components that are similar to those of the seal 100 (FIG. 1), and such similar components are given like numbers and a duplicate description thereof is omitted.

The seal 500 may include the insert 106 with a radial extension 502 that is generally similar to the radial extension 402 and may be connected to the radial portion 105A of the casing 104, e.g., by welding to form a weld 504.

In this embodiment, the lip 116 (e.g., FIG. 1) is omitted from the sealing element 102. Instead, an accessory 510 is provided, which generally has the same shape as the lip 116, but is separate from the sealing element 102 itself. For example, the accessory 510 may be formed from a machinable plastic, such as a thermoplastic polyurethane elastomer (TPU), for example, ECOPUR®.

The accessory 510 may be coupled to the seal 500 in a gap 508. The gap 508 may be formed between the inner diameter surface 109 of the casing 104 and the base 134 of the insert 106. For example, the insert 106 may include a bend 506 in an axial direction, away from the casing 104, as shown, to provide the gap 508. The accessory 510 may snap into or otherwise be received, e.g., in an interference fit into the gap 508, such that the portions of the casing 104 and the insert 106 defining the gap 508 provide a first engaging feature. The first engaging feature may thus engage and constrain the accessory 510 from motion relative thereto, at least in an axial direction.

The seal 500 may also include a second engaging feature 512, e.g., as part of or a part connected to the axial portion 105B of the casing 104. In this embodiment, the second engaging feature 512 may be bent to form a hook 514, which may extend, for example, radially inwards. Further, the thickness of the casing 104 at the hook 514 (or the portion of the separate component forming the hook 514 relative to the casing 104) may be reduced, e.g., to facilitate or otherwise allow for the bending. An accessory may be coupled with the second engaging feature 512, e.g., using a complementarily-shaped hook or another structure configured to cooperate with the second engaging feature 512 to resist displacement of the accessory relative to the casing 104 in at least one axial direction.

Accordingly, it will be appreciated that embodiments of the present disclosure may provide a seal that is both modular and provides an engaging feature that facilitates attachment of one or more accessories to the seal. The engaging feature may be relatively rigid, as compared to the sealing element, and may be coupled to or integrally-formed as a part of the casing. Thus, the engaging feature may be considered separate from the sealing element, e.g., formed as a separate piece which may be directly coupled to the sealing element or coupled thereto via the casing or an interposed portion thereof.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A seal, comprising:
a connector insert having a first wall portion and a second wall portion;
a generally annular casing including an axial cylinder and a flange projecting radially inward from a first end of the cylinder, the flange contacting the first wall portion of the connector insert at a first joint; and
a generally annular sealing element contacting the second wall portion of the connector insert at a second joint, the sealing element being configured to seal with a relatively movable member,
wherein the connector insert is separately formed from the sealing element and separately formed from the casing, and wherein a first portion of the connector insert lies axially inside the cylinder and a second portion of the connector insert lies axially outside the cylinder.

2. The seal of claim 1, wherein the second portion extends into a pocket in the sealing element.

3. The seal of claim 1, wherein the first wall portion is substantially perpendicular to the second wall portion or is substantially parallel to and not coplanar with the second wall portion.

4. The seal of claim 3, wherein the connector insert includes a radially outwardly facing channel, wherein the first wall portion comprises a first side of the channel and wherein the second wall portion is located outside the channel.

5. The seal of claim 4, wherein a sub-channel is defined by a second side of the channel and the flange, the sub-channel being configured to receive a portion of an accessory.

6. The seal of claim 3, wherein the connector insert includes a radially inwardly facing channel, the channel being configured to receive a portion of an accessory.

7. The seal of claim 3, wherein the connector insert includes a third wall portion substantially perpendicular to the first wall portion or substantially perpendicular to the second wall portion and a hook extending from the third wall portion.

8. The seal of claim 3, wherein the sealing element directly contacts the flange.

9. The seal of claim 3, wherein the sealing element projects axially from the flange and includes a ridge configured to contact the relatively moveable member and a lip configured to contact the relatively moveable member, wherein the ridge is spaced from the lip by an axial gap and wherein the ridge is located on an axially opposite side of the flange from the lip.

10. The seal of claim 3, wherein a first surface of the flange directly contacts the first wall portion of the connector and wherein a portion of the sealing element directly contacts a second surface of the flange.

11. The seal of claim 3, wherein the axial cylinder, the flange and the sealing element define a substantially U-shaped opening.

12. The seal of claim 3, wherein a width of the first wall portion of the connector insert is greater than an axial width of the flange.

13. The seal of claim 3, wherein the first wall portion is perpendicular to the second wall portion.

14. A sealing assembly, comprising:
a seal according to claim 1; and
an accessory connected to the second portion of the connector insert.

15. The sealing assembly of claim 14, wherein the accessory includes a secondary exclusionary device, a spacer, a seal configured to seal with the relatively movable member, or a combination thereof.

16. The sealing assembly of claim 14, wherein: the accessory includes a connector that is coupled with the connector insert.

17. The sealing assembly of claim 16, wherein the connector insert is welded or soldered to the casing.

18. The sealing assembly of claim 14,
wherein the connector insert includes a radially outwardly facing channel,
wherein the first wall portion comprises a first side of the channel and wherein the second wall portion is located outside the channel,
wherein a sub-channel is defined by a second side of the channel and the flange, and
wherein a portion of the accessory is mounted in the sub-channel.

19. The sealing assembly according to claim 14,
wherein the connector insert includes a radially inwardly facing channel, and
wherein a portion of an accessory is mounted in the channel.

20. A seal, comprising:
a connector insert having a first wall portion and a second wall portion;
a generally annular casing including an axial cylinder and a flange projecting radially inward from a first end of the cylinder, the flange contacting the first wall portion of the connector insert at a first joint; and
a generally annular sealing element contacting the second wall portion of the connector insert at a second joint, the sealing element being configured to seal with a relatively movable member,
wherein the connector insert is separately formed from the sealing element and separately formed from the casing,
wherein an inwardly facing channel configured to receive an accessory is defined by a portion of the flange and a portion of the connector, and
wherein the sealing element does not contact the cylinder.

21. A seal assembly including:
the seal according to claim 20; and
the accessory mounted in the channel.

* * * * *